US010582197B2

(12) United States Patent
Wakatsuki

(10) Patent No.: US 10,582,197 B2
(45) Date of Patent: Mar. 3, 2020

(54) ENCODER, ENCODING METHOD, CAMERA, RECORDER, AND CAMERA-INTEGRATED RECORDER

(71) Applicant: SONY CORPORATION, Tokyo (JP)

(72) Inventor: Norio Wakatsuki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 74 days.

(21) Appl. No.: 15/314,335

(22) PCT Filed: May 19, 2015

(86) PCT No.: PCT/JP2015/064387
§ 371 (c)(1),
(2) Date: Nov. 28, 2016

(87) PCT Pub. No.: WO2015/190248
PCT Pub. Date: Dec. 17, 2015

(65) Prior Publication Data
US 2017/0201748 A1 Jul. 13, 2017

(30) Foreign Application Priority Data
Jun. 13, 2014 (JP) ................. 2014-122640

(51) Int. Cl.
*H04N 19/112* (2014.01)
*H04N 7/01* (2006.01)
(Continued)

(52) U.S. Cl.
CPC ........... *H04N 19/112* (2014.11); *H04N 19/39* (2014.11); *H04N 19/59* (2014.11)

(58) Field of Classification Search
CPC ....... H04N 19/112; H04N 19/39; H04N 19/59
See application file for complete search history.

(56) References Cited

U.S. PATENT DOCUMENTS 5,475,435 A * 12/1995 Yonemitsu ........... H04N 5/9264
348/426.1
5,867,625 A 2/1999 McLaren
(Continued)

FOREIGN PATENT DOCUMENTS

| CN | 1090116 A | 7/1994 |
| CN | 1169229 A | 12/1997 |

(Continued)

OTHER PUBLICATIONS

International Search Report and Written Opinion of PCT Application No. PCT/JP2015/064387, dated Jul. 14, 2015, 7 pages of English Translation and 7 pages of ISRWO.
(Continued)

*Primary Examiner* — Christopher Braniff
(74) *Attorney, Agent, or Firm* — Chip Law Group

(57) ABSTRACT

Efficient editing is enabled when a video material encoded as an interlaced signal is mixed during editing. A first video signal in a progressive mode is obtained. This first video signal is encoded. The first video signal or a second video signal obtained by reducing resolution and/or a frame rate of the first video signal is converted to an interlaced signal from a progressive signal such that a third video signal is obtained. The third video signal is encoded. Encoded data of the first video signal and encoded data of the third video signal are recorded to a recording medium.

19 Claims, 3 Drawing Sheets

(51) Int. Cl.
*H04N 19/39* (2014.01)
*H04N 19/59* (2014.01)
*H04N 19/587* (2014.01)

(56) References Cited

U.S. PATENT DOCUMENTS

| | | | |
|---|---|---|---|
| 7,869,505 B2 * | 1/2011 | Rodriguez | H04N 21/25808 375/240.02 |
| 8,462,192 B2 * | 6/2013 | O'Connell | G03B 15/02 348/14.01 |
| 2004/0008790 A1 * | 1/2004 | Rodriguez | H04N 5/76 375/240.26 |
| 2007/0086666 A1 * | 4/2007 | Bruls | H04N 19/61 382/240 |
| 2013/0202272 A1 | 8/2013 | Minoshima | |
| 2014/0092998 A1 * | 4/2014 | Zhu | H04N 19/70 375/240.29 |

FOREIGN PATENT DOCUMENTS

| | | |
|---|---|---|
| EP | 0596423 A2 | 5/1994 |
| EP | 0644695 A2 | 3/1995 |
| JP | 06-153183 A | 5/1994 |
| JP | 07-162870 A | 6/1995 |
| JP | 10-507886 A | 7/1998 |
| JP | 2006-303627 A | 11/2006 |
| JP | 2010-041408 A | 2/2010 |
| JP | 2013-162485 A | 8/2013 |
| KR | 10-0384822 B1 | 8/2003 |
| WO | 1996/013121 A1 | 5/1996 |

OTHER PUBLICATIONS

International Preliminary Report on Patentability of PCT Application No. PCT/JP2015/064387, dated Dec. 22, 2016, 7 pages of English Translation and 4 pages of IPRP.

* cited by examiner

ENCODER, ENCODING METHOD, CAMERA, RECORDER, AND CAMERA-INTEGRATED RECORDER

CROSS REFERENCE TO RELATED APPLICATIONS

This application is a U.S. National Phase of International Patent Application No. PCT/JP2015/064387 filed on May 19, 2015, which claims priority benefit of Japanese Patent Application No. JP 2014-122640 filed in the Japan Patent Office on Jun. 13, 2014. Each of the above-referenced applications is hereby incorporated herein by reference in its entirety.

TECHNICAL FIELD

The present technology relates to an encoder, an encoding method, a camera, a recorder, and a camera-integrated recorder. In particular, the present invention relates to an encoder that handles a video signal in a progressive mode, and so on.

BACKGROUND ART

A camera-integrated recorder (hereinafter, referred to as "camcorder" as appropriate) or a recorder that encodes and records a high resolution image signal as well as a low resolution image signal has been common in the past. Low resolution encoded data is called a proxy in comparison with high resolution main line data. Proxy data has lower resolution and a smaller encoding rate than those of the main line data and thus, decoding processing and transmission processing at the time of confirming the content after being recorded are carried out with ease. Accordingly, there is an advantage in recording the proxy simultaneously with the main line data.

For example, an HDTV signal of 1920 horizontal pixels× 1080 vertical lines is encoded in an MPEG-2 mode so as to be recorded as the main line at a data rate of approximately 60 Mbps along with data of audio and soon and also encoded in an MPEG-4 AVC mode at resolution of 352 horizontal pixels×240 vertical lines (source input format (SIF)) so as to be recorded as the proxy at a data rate of approximately 1.5 Mbps along with data of audio and so on.

Incidentally, in accordance with the expansion of an HDTV, it has currently become usual not only in a camcorder for broadcasting or professional use but also in a camcorder for home use to record and store HDTV content as encoded data in the MPEG-2 mode, the MPEG-4 AVC mode, or the like, where an interlaced signal of 59.94i or 50i is encoded in most cases.

Meanwhile, in future, content at higher resolution such as 4K and 8K will be able to be created and it is assumed that a camera-integrated recorder or a recorder having such a configuration that a main line image is in 4K or 8K and a proxy image uses the resolution of the HDTV can become the mainstream thereof. However, imaging by way of interlaced scanning is expected not to be used for the resolution of 4K and 8K in future.

Actually, all of 4K camera-integrated recorders currently in the market use progressive scanning to image and a progressive signal during encoding. Some of the 4K camera-integrated recorders can also record the low resolution proxy at the same time. However, even in a case where the proxy is at the HDTV resolution, both of the main line and the proxy are encoded by using the progressive signals when a signal source employs the progressive signal such as 1920× 1080/59.94p or 1920×1080/29.97p.

Then, even though the high resolution such as 4K will be able to be used relatively with ease in future for imaging, recording, and storing, when it is assumed as described above that the HDTV currently serves as the main resolution for content, an affinity with an existing content creation process for the HDTV can be enhanced by imaging content at the high resolution such as 4K simultaneously with imaging at the resolution of the HDTV and additionally encoding and recording in the MPEG-2 or MPEG4-4 AVC.

Editing work serves as part of the content creation process and recently, so-cold non-linear editing has been carried out in many cases, in which the encoded data is cut and pasted on a PC to be edited. At this time, when a certain condition such as similarity in resolution or similarity in frame rates is satisfied, a method called smart rendering can be employed between materials encoded in, for example, the MPEG-2 mode, in which efficient editing is achieved by exclusively reencoding a vicinity of an editing point even when cutting and pasting are carried out (for example, refer to Patent Document 1). However, whether to be an interlaced signal or a progressive signal acts as a condition for determining whether the smart rendering is available and thus, the smart rendering cannot be used in editing where both types of the signals are mixed. In order to adhere to one of the scanning modes, one of the materials needs to be encoded one more time.

In consideration of such a workflow, as long as a large number of interlaced materials for the HDTV are still used, even in a case where the encoded data at the HDTV resolution can be generated as the proxy, when the encoded data as the progressive signal only can be generated, reencoding processing across a wide range is required during an editing process where the existing interlaced material is mixed, even in the encoding mode such as the MPEG-2 and the MPEG-4 AVC. As a result, degradation in image quality and time loss due to reencoding occur, which has served as a cause of preventing high efficient content creation.

CITATION LIST

Patent Document

Patent Document 1: Japanese Patent Application Laid-Open No. 2010-154502

SUMMARY OF THE INVENTION

Problems to be Solved by the Invention

An object of the present technology is to enable efficient editing when a video material encoded as an interlaced signal is mixed during editing.

Solutions to Problems

A concept of the present technology is present in an encoder including:
a first encoding unit that encodes a first video signal in a progressive mode;
a scanning mode conversion unit that converts the first video signal or a second video signal obtained by reducing resolution and/or a frame rate of the first video signal to an interlaced signal from a progressive signal to obtain a third video signal; and a second encoding unit that encodes the third video signal.

According to the present technology, the first video signal in the progressive mode is encoded by the first encoding unit. For example, an imaging unit that obtains the first video signal may be further provided. In addition, for example, the first video signal may be configured to be a progressive signal at resolution of 4K or higher.

The first video signal or the second video signal obtained by reducing the resolution and/or the frame rate of the first video signal is converted to the interlaced signal from the progressive signal by the scanning mode conversion unit such that the third video signal is obtained. For example, the second video signal may be configured to be a progressive signal at HD resolution with a frame rate of 29.97 Hz or 25 Hz.

The third video signal is encoded by the second encoding unit. For example, the second encoding unit may be configured to use an ISO/IEC 13818-2 MPEG-2 mode or an ISO/IEC 14496-10 MPEG-4 AVC mode in encoding. Additionally, a recording unit that records encoded data obtained at the first encoding unit and encoded data obtained at the second encoding unit to a recording medium may be further provided.

As described above, the present technology not only encodes the first video signal in a progressive mode but also encodes the third video signal obtained by converting this second video signal or the second video signal obtained by reducing the resolution and/or the frame rate of the first video signal to the interlaced signal from the progressive signal. As a result, efficient editing is enabled when a video material encoded as the interlaced signal is mixed during editing.

In addition, for example, the present technology may be configured to further include a selection unit that picks out the second video signal or the third video signal selectively such that the second encoding unit encodes the video signal picked out at the selection unit. In this case, it is made possible to encode the progressive signal or the interlaced signal selectively as the proxy as necessary.

Effects of the Invention

According to the present technology, efficient editing is enabled when a video material encoded as the interlaced signal is mixed during editing. Note that the effects described in the present description merely serve as examples and are not construed to be limited. There may be an additional effect.

MODE FOR CARRYING OUT THE INVENTION

Modes for carrying out the invention (hereinafter, referred to as "embodiments") will be described below. Note that the description will be given in the following order.
1. First Embodiment
2. Second Embodiment
3. Third Embodiment
4. Variation 1. First Embodiment

[Configuration of Video Processing Device]

Figure 1:
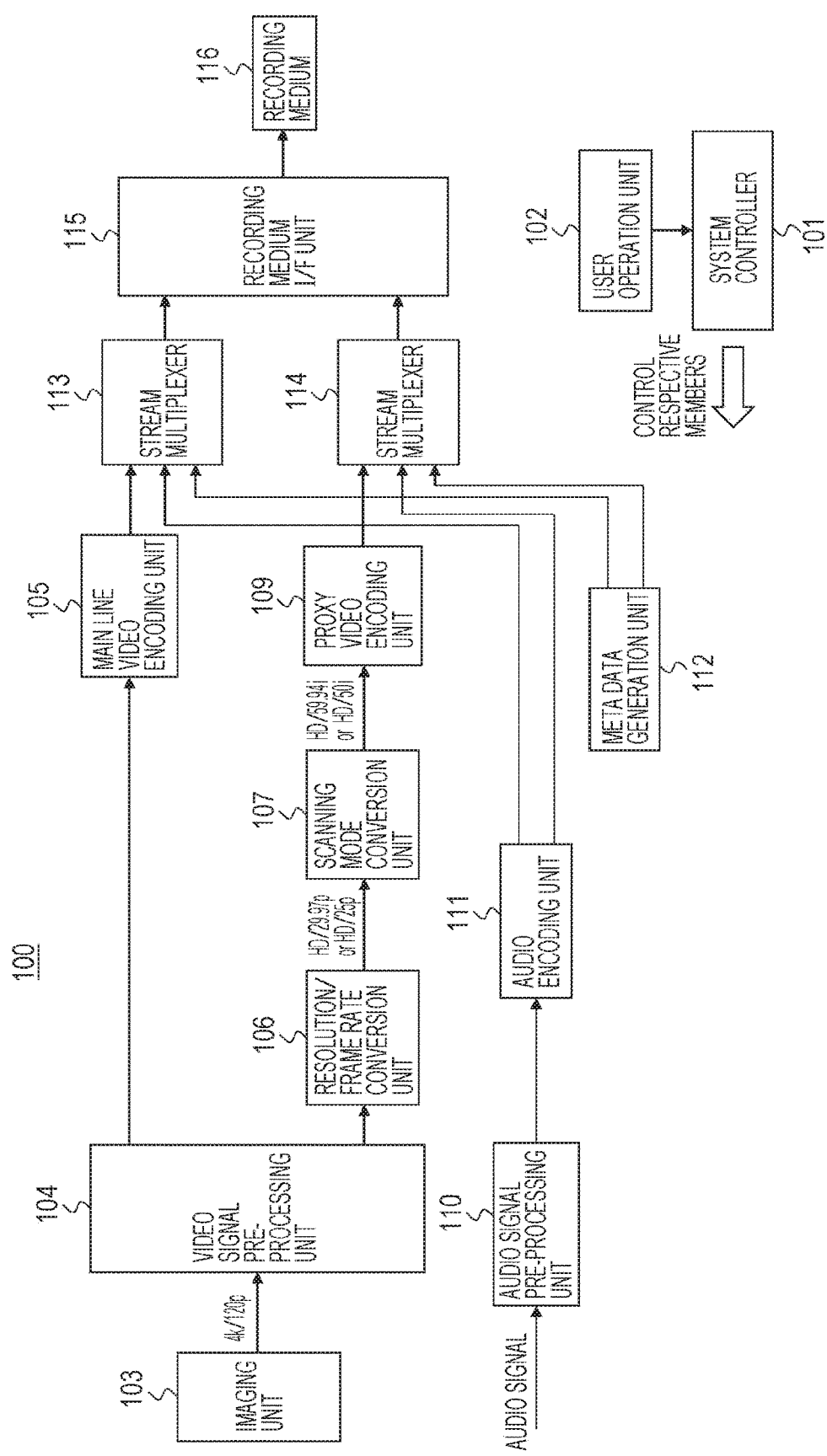
FIG. 1 is a block diagram illustrating an exemplary configuration of a camera-integrated recorder as a first embodiment.

FIG. 1 illustrates an exemplary configuration of a camera-integrated recorder 100 as a first embodiment. This camera-integrated recorder 100 includes a system controller 101, a user operation unit 102, an imaging unit 103, a video signal pre-processing unit 104, a main line video encoding unit 105, a resolution/frame rate conversion unit 106, and a scanning mode conversion unit 107. This camera-integrated recorder 100 also includes a proxy video encoding unit 109, an audio signal pre-processing unit 110, an audio encoding unit 111, a meta data generation unit 112, stream multiplexers 113 and 114, a recording medium interface unit 115, and a recording medium 116.

The system controller 101 controls respective members of the camera-integrated recorder 100. This system controller 101 is constituted by a single or a plurality of central processing units (CPUs). The user operation unit 102 is connected to the system controller 101 and constitutes a user interface with which a user carries out various operations.

The imaging unit 103 uses progressive scanning to image and obtains a video signal at resolution of 4K or higher, specifically here, a progressive video signal at 4K resolution with a frame rate of 120 Hz. The 4K resolution here means resolution of, for example, 3840 horizontal pixels by 2160 vertical lines or 4096 horizontal pixels by 2160 vertical lines. The video signal pre-processing unit 104 carries out various types of processing on the video signal at 4K/120P obtained at the imaging unit 103, such as gain control, white balance adjustment, and gamma correction.

The main line video encoding unit 105 carries out encoding processing on the video signal at 4K/120p processed at the video signal pre-processing unit 104 to obtain the encoded data of the progressive signal at 4K. This main line video encoding unit 105 uses, for example, an ISO/IEC 14496-10 MPEG-4 AVC mode in encoding.

The resolution/frame rate conversion unit 106 carries out resolution/frame rate conversion processing on the video signal at 4K/120p processed at the video signal pre-processing unit 104 to obtain the progressive video signal at HD resolution with a frame rate of 29.97 Hz or 25 Hz. The HD resolution here means resolution of, for example, 1920 horizontal pixels by 1080 vertical lines or 1440 horizontal pixels by 1080 vertical lines. The scanning mode conversion unit 107 converts the video signal at HD/29.97p or HD/25p obtained at the resolution/frame rate conversion unit 106 to an interlaced signal from the progressive signal to obtain an interlaced video signal at HD/59.94i or HD/50i.

The proxy video encoding unit 109 carries out the encoding processing on the video signal obtained at the scanning mode conversion unit 107 to obtain the encoded data of the interlaced signal at HD. An encoding parameter at this time point is aligned with an encoding parameter of an existing camera-integrated recorder or recorder that has generated a material supposed to be mixed later when being utilized. For example, this proxy video encoding unit 109 uses an ISO/IEC 13818-2 MPEG-2 mode or the ISO/IEC 14496-10 MPEG-4 AVC mode in encoding.

The audio signal pre-processing unit 110 carries out various types of processing such as level control and noise removal on an audio signal corresponding to the video signal obtained at the imaging unit 103. The audio encoding unit 111 carries out the encoding processing on the audio signal processed at the audio signal pre-processing unit 110 to obtain the encoded data of the audio signal. In this case, the audio encoding unit 111 outputs the encoded data for the main line and for the proxy. The two types of the encoded data may be similar to each other or different from each other. For example, linear PCM may be used for the encoded data for the main line whereas encoded data that has been compressed may be used for the encoded data for the proxy. The meta data generation unit 112 generates auxiliary data other than the video and the audio, and so on as meta data.

The stream multiplexer 113 bundles the encoded data of the progressive signal at 4K obtained at the main line video encoding unit 105, the encoded audio data obtained at the audio encoding unit 111, and the meta data generated at the meta data generation unit 112 in accordance with a file format such as the material exchange format (MXF) or the MP4 (ISO/IEC 14496-14:2003) to generate main line recorded data.

The stream multiplexer 114 bundles the encoded data of the interlaced signal at HD obtained at the proxy video encoding unit 109, the encoded audio data obtained at the audio encoding unit 111, and the meta data generated at the meta data generation unit 112 in accordance with a file format such as the MXF or the MP4 to generate proxy recorded data.

The recording medium interface unit 115 records the recorded data generated at the stream multiplexers 113 and 114 to the recording medium 116. The recording medium 116 is a semiconductor memory, an optical disc, a magnetic disk, or the like. Note that, although the illustrated example solely indicates one recording medium 116, a recording medium 116 for recording the main line recorded data and a recording medium 116 for recording the proxy recorded data may be provided separately. In addition, the illustrated example is configured to record to one recording medium 116. However, a configuration for simultaneously recording to a plurality of recording media is also considered.

The action of the camera-integrated recorder 100 illustrated in FIG. 1 will be described. At the imaging unit 103, imaging by way of the progressive scanning is carried out such that the progressive video signal at 4K resolution with a frame rate of 120 Hz is obtained. This progressive video signal is supplied to the video signal pre-processing unit 104 to undergo various types of processing such as gain control, white balance adjustment, and gamma correction. The video signal at 4K/120p after the processing is supplied to the main line encoding unit 105. At the main line encoding unit 105, the encoding processing is carried out on this video signal such that the encoded data of the progressive signal at 4K is obtained.

The video signal at 4K/120p after the processing is also supplied to the resolution/frame rate conversion unit 106. At this resolution/frame rate conversion unit 106, the resolution/frame rate conversion processing is carried out on the video signal at 4K/120p after the processing such that the progressive video signal at HD resolution with a frame rate of 29.97 Hz or 25 Hz is obtained. This progressive video signal is supplied to the scanning mode conversion unit 107.

At the scanning mode conversion unit 107, the progressive signal is converted to the interlaced signal such that the interlaced video signal at HD/59.94i or HD/50i is obtained. This interlaced video signal is supplied to the proxy video encoding unit 109. At the proxy video encoding unit 109, the encoding processing is carried out such that the encoded data of the interlaced signal at HD is obtained. At this time point, the encoding parameter is aligned with the encoding parameter of the existing camera-integrated recorder or recorder that has generated the material supposed to be mixed later when being utilized.

Meanwhile, the audio signal corresponding to the video signal obtained at the imaging unit 103 is supplied to the audio signal pre-processing unit 110. At this audio signal processing unit 110, various types of processing such as level control and noise removal are carried out. The audio signal after the processing is supplied to the audio encoding unit 111. At the audio encoding unit 111, the encoding processing is carried out on this audio signal such that the encoded data thereof is obtained. Additionally, at the meta data generation unit 112, the auxiliary data other than the video and the audio, and so on are generated as the meta data.

The encoded data of the progressive signal at 4K obtained at the main line video encoding unit 105, the encoded audio data obtained at the audio encoding unit 111, and the meta data generated at the meta data generation unit 112 are supplied to the stream multiplexer 113. At this stream multiplexer 113, these types of the data are bundled in accordance with a file format such as the MXF or the MP4 such that the main line recorded data is generated.

Meanwhile, the encoded data of the interlaced signal at HD obtained at the proxy video encoding unit 109, the encoded audio data obtained at the audio encoding unit 111, and the meta data generated at the meta data generation unit 112 are supplied to the stream multiplexer 114. At this stream multiplexer 114, these types of the data are bundled in accordance with a file format such as the MXF or the MP4 such that the proxy recorded data is generated.

The main line recorded data generated at the stream multiplexer 113 and the proxy recorded data generated at the stream multiplexer 114 are supplied to the recording medium interface unit 115. Subsequently, at this recording medium interface unit 115, these types of the recorded data are recorded to the recording medium 116.

As described above, in the camera-integrated recorder 100 illustrated in FIG. 1, it is made possible to record the progressive video signal at 4K as a main line video signal and at the same time to record the interlaced video signal at HD as a proxy video signal simultaneously, where the interlaced video signal has a high affinity with a material of the interlaced video signal at HD which is considered to occupy a large portion of the current cases. Accordingly, smart rendering at an editing point is enabled in non linear editing (NLE) in which an existing video signal material is mixed.

During a transition period when a trend toward the high resolution is proceeding from the current HD to 4K and 8K, increasing needs not only for maintaining a material at as high resolution and high image quality as possible for the near future but also for efficiently creating content by using a current system or a current workflow are predicted. The camera-integrated recorder 100 illustrated in FIG. 1 can satisfy both of the needs.

2. Second Embodiment

[Configuration of Video Processing Device]

Figure 2:
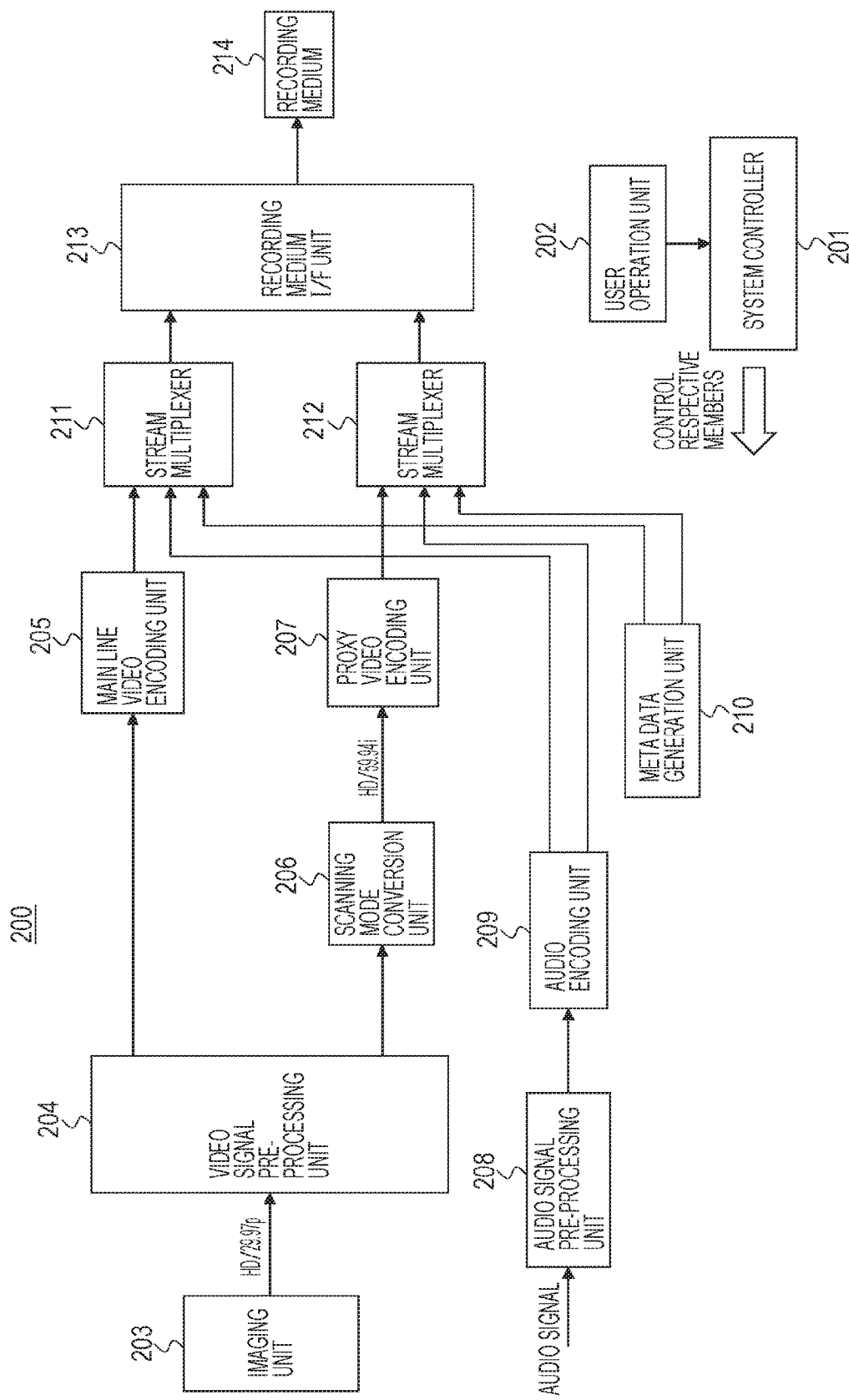
FIG. 2 is a block diagram illustrating an exemplary configuration of a camera-integrated recorder as a second embodiment.

FIG. 2 illustrates an exemplary configuration of a camera-integrated recorder 200 as a second embodiment. This camera-integrated recorder 200 includes a system controller 201, a user operation unit 202, an imaging unit 203, a video signal pre-processing unit 204, a main line video encoding unit 205, and a scanning mode conversion unit 206. This camera-integrated recorder 200 also includes a proxy video encoding unit 207, an audio signal pre-processing unit 208, an audio encoding unit 209, a meta data generation unit 210, stream multiplexers 211 and 212, a recording medium interface unit 213, and a recording medium 214.

The system controller 201 controls respective members of the camera-integrated recorder 200. This system controller 201 is constituted by a single or a plurality of central processing units (CPUs). The user operation unit 202 is connected to the system controller 101 and constitutes a user interface with which a user carries out various operations.

The imaging unit 203 images by using the progressive scanning to obtain the progressive video signal at HD resolution with a frame rate of 29.97 Hz. The HD resolution here means resolution of, for example, 1920 horizontal pixels by 1080 vertical lines or 1440 horizontal pixels by 1080 vertical lines. The video signal pre-processing unit 204 carries out various types of processing on the video signal at HD/29.97p obtained at the imaging unit 203, such as gain control, white balance adjustment, and gamma correction.

The main line video encoding unit 205 carries out the encoding processing on the video signal at HD/29.97p processed at the video signal pre-processing unit 204 to obtain the encoded data of the progressive signal at HD. This main line video encoding unit 205 uses, for example, the ISO/IEC 14496-10 MPEG-4 AVC mode at a high bit rate (220 Mbps) in encoding.

The scanning mode conversion unit 206 converts the video signal at HD/29.97p processed at the video signal pre-processing unit 204 to the interlaced signal from the progressive signal to obtain the interlaced video signal at HD/59.94i. The proxy video encoding unit 207 carries out the encoding processing on the video signal obtained at the scanning mode conversion unit 206 to obtain the encoded data of the interlaced signal at HD. An encoding parameter at this time point is aligned with the encoding parameter of the existing camera-integrated recorder or recorder that has generated the material supposed to be mixed later when being utilized. This proxy video encoding unit 207 uses, for example, the ISO/IEC 13818-2 MPEG-2 mode at a low bit rate (50 Mbps) in encoding.

The audio signal pre-processing unit 208 carries out various types of processing such as level control and noise removal on the audio signal corresponding to the video signal obtained at the imaging unit 203. The audio encoding unit 209 carries out the encoding processing on the audio signal processed at the audio signal pre-processing unit 208 to obtain the encoded data of the audio signal. In this case, the audio encoding unit 209 outputs the encoded data for the main line and for the proxy. The two types of the encoded data may be similar to each other or different from each other. For example, the linear PCM may be used for the encoded data for the main line whereas encoded data that has been compressed may be used for the encoded data for the proxy. The meta data generation unit 210 generates the auxiliary data other than the video and the audio, and so on as meta data.

The stream multiplexer 211 bundles the encoded data of the progressive signal at HD obtained at the main line video encoding unit 205, the encoded audio data obtained at the audio encoding unit 209, and the meta data generated at the meta data generation unit 210 in accordance with a file format such as the MXF or the MP4 to generate the main line recorded data.

The stream multiplexer 212 bundles the encoded data of the interlaced signal at HD obtained at the proxy video encoding unit 207, the encoded audio data obtained at the audio encoding unit 209, and the meta data generated at the meta data generation unit 210 in accordance with a file format such as the MXF or the MP4 to generate the proxy recorded data.

The recording medium interface unit 213 records the recorded data generated at the stream multiplexers 211 and 212 to the recording medium 214. The recording medium 214 is a semiconductor memory, an optical disc, a magnetic disk, or the like. Note that, although the illustrated example solely indicates one recording medium 214, a recording medium 214 for recording the main line recorded data and a recording medium 214 for recording the proxy recorded data may be provided separately.

The action of the camera-integrated recorder 200 illustrated in FIG. 2 will be described. At the imaging unit 203, imaging by way of the progressive scanning is carried out such that the progressive video signal at HD resolution with a frame rate of 29.97 Hz is obtained. This progressive video signal is supplied to the video signal pre-processing unit 204 to undergo various types of processing such as gain control, white balance adjustment, and gamma correction. The video signal at HD/29.97p after the processing is supplied to the main line encoding unit 205. At the main line encoding unit 205, the encoding processing is carried out in the MPEG-4 AVC mode at a high bit rate such that the encoded data of the progressive signal at HD is obtained.

The video signal at HD/29.97p after the processing is also supplied to the scanning mode conversion unit 206. At this scanning mode conversion unit 206, the progressive signal is converted to the interlaced signal such that the interlaced video signal at HD/59.94i is obtained. This interlaced video signal is supplied to the proxy video encoding unit 207. At the proxy video encoding unit 207, the encoding processing is carried out in the MPEG-2 mode at a low bit rate such that the encoded data of the interlaced signal at HD is obtained. At this time point, the encoding parameter is aligned with the encoding parameter of the existing camera-integrated recorder or recorder that has generated the material supposed to be mixed later when being utilized.

Meanwhile, the audio signal corresponding to the video signal obtained at the imaging unit 203 is supplied to the audio signal pre-processing unit 208. At this audio signal processing unit 208, various types of processing such as level control and noise removal are carried out. The audio signal after the processing is supplied to the audio encoding unit 209. At the audio encoding unit 209, the encoding processing is carried out on this audio signal such that the encoded data thereof is obtained. Additionally, at the meta data generation unit 210, the auxiliary data other than the video and the audio, and so on are generated as the meta data.

The encoded data of the progressive signal at HD obtained at the main line video encoding unit 205, the encoded audio data obtained at the audio encoding unit 209, and the meta data generated at the meta data generation unit 210 are supplied to the stream multiplexer 211. At this stream multiplexer 211, these types of the data are bundled in accordance with a file format such as the MXF or the MP4 such that the main line recorded data is generated.

Meanwhile, the encoded data of the interlaced signal at HD obtained at the proxy video encoding unit 207, the encoded audio data obtained at the audio encoding unit 209, and the meta data generated at the meta data generation unit 210 are supplied to the stream multiplexer 212. At this stream multiplexer 212, these types of the data are bundled in accordance with a file format such as the MXF or the MP4 such that the proxy recorded data is generated.

The main line recorded data generated at the stream multiplexer 211 and the proxy recorded data generated at the stream multiplexer 212 are supplied to the recording medium interface unit 213. Subsequently, at this recording medium interface unit 213, these types of the recorded data are recorded to the recording medium 214.

As described above, in the camera-integrated recorder 200 illustrated in FIG. 2, it is made possible to record the progressive video signal at HD as the main line video signal and at the same time to record the interlaced video signal at HD as the proxy video signal simultaneously, where the interlaced video signal has a high affinity with a material of the interlaced video signal at HD which is considered to occupy a large portion of the current cases. Accordingly, the smart rendering at an editing point is enabled in the NLE in which an existing video signal material is mixed.

3. Third Embodiment

[Configuration of Video Processing Device]

Figure 3:
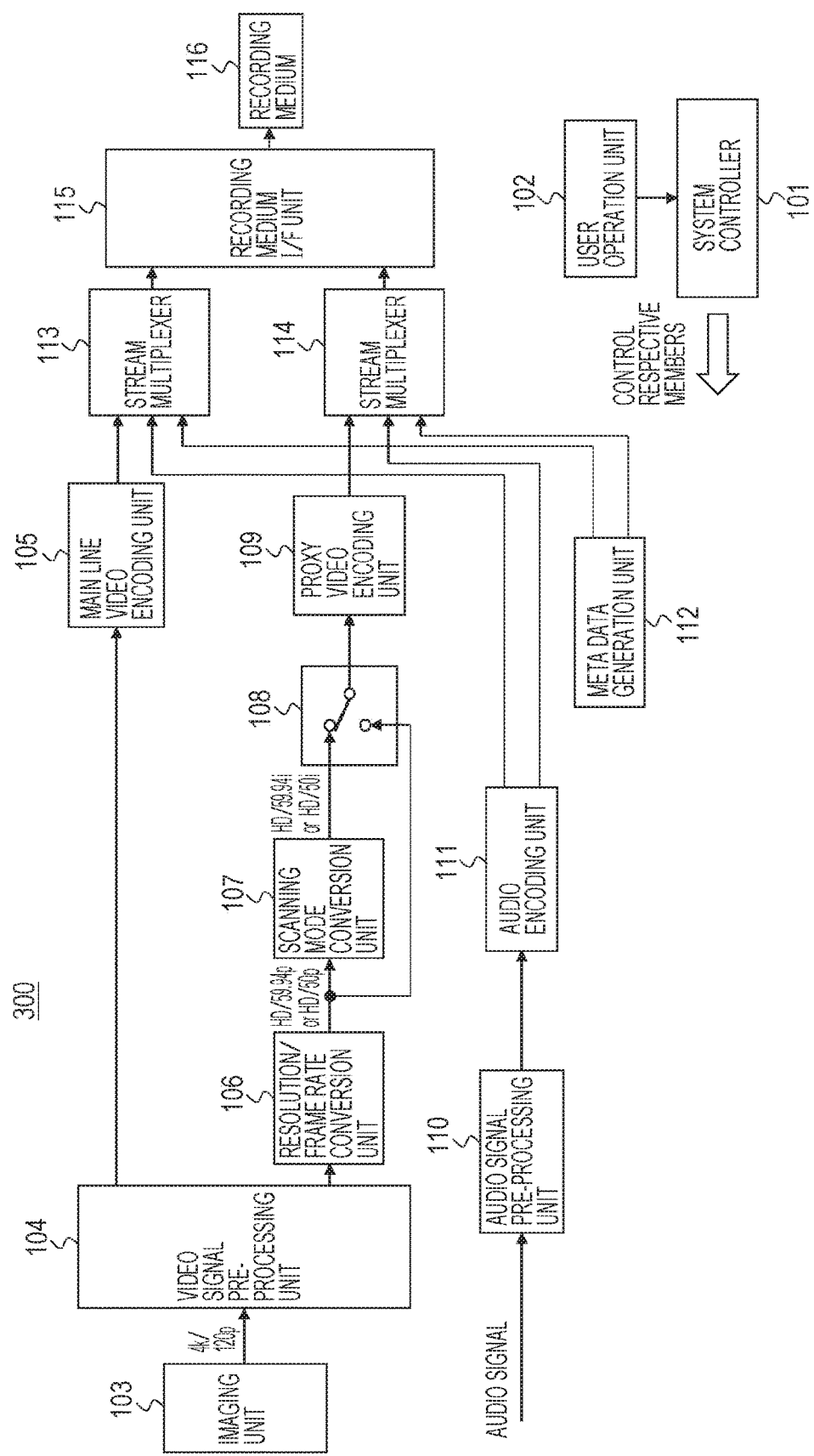
FIG. 3 is a block diagram illustrating an exemplary configuration of a camera-integrated recorder as a third embodiment.

FIG. 3 illustrates an exemplary configuration of a camera-integrated recorder 300 as a third embodiment. In this FIG. 3, sections corresponding to those in FIG. 1 are given the same reference numerals and the detailed description thereof will be omitted.

This camera-integrated recorder 300 includes a system controller 101, a user operation unit 102, an imaging unit 103, a video signal pre-processing unit 104, a main line video encoding unit 105, a resolution/frame rate conversion unit 106, and a scanning mode conversion unit 107. This camera-integrated recorder 300 also includes a selection unit 108, a proxy video encoding unit 109, an audio signal pre-processing unit 110, an audio encoding unit 111, a meta data generation unit 112, stream multiplexers 113 and 114, a recording medium interface unit 115, and a recording medium 116.

The selection unit 108 picks out the interlaced video signal obtained at the scanning mode conversion unit 107 or the progressive video signal obtained at the resolution/frame rate conversion unit 106 selectively. This selection at the selection unit 108 is controlled by, for example, the system controller 101 in accordance with the selection operation by the user.

The proxy video encoding unit 109 carries out the encoding processing on the video signal picked out at the selection unit 108 such that the encoded data of the interlaced signal or the progressive signal at HD is obtained. The stream multiplexer 114 bundles the encoded data of the interlaced signal or the progressive signal at HD obtained at the proxy video encoding unit 109, the encoded audio data obtained at the audio encoding unit 111, and the meta data generated at the meta data generation unit 112 in accordance with a file format such as the MXF or the MP4 to generate the proxy recorded data.

Although the detailed description is omitted, the other configuration of the camera-integrated recorder 300 illustrated in FIG. 3 is similar to that of the camera-integrated recorder 100 in FIG. 1.

As described above, in the camera-integrated recorder 300 illustrated in FIG. 3, it is made possible to record the HD interlaced video signal or the HD progressive video signal selectively as the proxy video signal.

As for the camera-integrated recorder 300 illustrated in FIG. 3, an example where the progressive video signal at 4K and the interlaced video signal at HD, or alternatively, the progressive video signal at 4K and the progressive video signal at HD are recorded has been indicated. However, recording all of the progressive video signal at 4K, the interlaced video signal at HD, and the progressive video signal at HD is also considered.

4. Variation

Note that, although the aforementioned embodiments have indicated an example in which the present technology is applied to the camera-integrated recorder, the present technology can be of course applied similarly to, for example, a recorder not provided with an imaging unit or a camera not provided with a recording unit as well.

Additionally, the present technology can also employ such configurations as described below.

(1) An encoder including:

a first encoding unit that encodes a first video signal in a progressive mode;

a scanning mode conversion unit that converts the first video signal or a second video signal obtained by reducing resolution and/or a frame rate of the first video signal to an interlaced signal from a progressive signal to obtain a third video signal; and a second encoding unit that encodes the third video signal.

(2) The encoder according to the aforementioned (1), further including an imaging unit that obtains the first video signal.

(3) The encoder according to the aforementioned (1), further including a recording unit that records encoded data obtained at the first encoding unit and encoded data obtained at the second encoding unit to a recording medium.

(4) The encoder according to the aforementioned (1), further including:

an imaging unit that obtains the first video signal; and a recording unit that records encoded data obtained at the first encoding unit and encoded data obtained at the second encoding unit to a recording medium.

(5) The encoder according to any one of the aforementioned (1) to (4), further including a selection unit that picks out the second video signal or the third video signal selectively, in which the second encoding unit encodes the video signal picked out at the selection unit.

(6) The encoder according to any one of the aforementioned (1) to (5), in which the second video signal is a progressive signal at HD resolution with a frame rate of 29.97 Hz or 25 Hz.

(7) The encoder according to any one of the aforementioned (1) to (6), in which the first video signal is a progressive signal at resolution of 4K or higher.

(8) The encoder according to any one of the aforementioned (1) to (7), in which the second encoding unit uses an ISO/IEC 13818-2 MPEG-2 mode in encoding.

(9) The encoder according to any one of the aforementioned (1) to (7), in which the second encoding unit uses an ISO/IEC 14496-10 MPEG-4 AVC mode in encoding.

(10) An encoding method including:

a first encoding step of encoding a first video signal in a progressive mode by using a first encoding unit;

a scanning mode conversion step of converting the first video signal or a second video signal obtained by reducing resolution and/or a frame rate of the first video signal to an interlaced signal from a progressive signal to obtain a third video signal; and a second encoding step of encoding the third video signal by using a second encoding unit.

(11) A camera including:
an imaging unit that obtains a first video signal in a progressive mode;
a first encoding unit that encodes the first video signal;
a scanning mode conversion unit that converts the first video signal or a second video signal obtained by reducing resolution and/or a frame rate of the first video signal to an interlaced signal from a progressive signal to obtain a third video signal; and
a second encoding unit that encodes the third video signal.

(12) A recorder including:
a first encoding unit that encodes a first video signal in a progressive mode;
a scanning mode conversion unit that converts the first video signal or a second video signal obtained by reducing resolution and/or a frame rate of the first video signal to an interlaced signal from a progressive signal to obtain a third video signal;
a second encoding unit that encodes the third video signal; and
a recording unit that records encoded data obtained at the first encoding unit and encoded data obtained at the second encoding unit to a recording medium.

(13) A camera-integrated recorder including:
an imaging unit that obtains a first video signal in a progressive mode;
a first encoding unit that encodes the first video signal;
a scanning mode conversion unit that converts the first video signal or a second video signal obtained by reducing resolution and/or a frame rate of the first video signal to an interlaced signal from a progressive signal to obtain a third video signal;
a second encoding unit that encodes the third video signal; and
a recording unit that records encoded data obtained at the first encoding unit and encoded data obtained at the second encoding unit to a recording medium.

REFERENCE SIGNS LIST 100, 200, 300 Camera-integrated recorder
101, 201 System controller
102, 202 User operation unit
103, 203 Imaging unit
104, 204 Video signal pre-processing unit
105, 205 Main line video encoding unit
106 Resolution/frame rate conversion unit
107, 206 Scanning mode conversion unit
108 Selection unit
109, 207 Proxy video encoding unit
110, 208 Audio signal pre-processing unit
111, 209 Audio encoding unit
112, 210 Meta data generation unit
113, 114, 211, 212 Stream multiplexer
115, 213 Recording medium interface unit
116, 214 Recording medium

The invention claimed is:

1. An encoder, comprising:
at least one processor configured to:
encode a first video signal in a progressive mode;
convert one of the first video signal or a second video signal to an interlaced signal from a progressive signal to obtain a third video signal, wherein the second video signal is obtained by reduction in at least one of a resolution or a frame rate of the first video signal;
encode the third video signal;
multiplex a first encoded video data obtained when the first video signal is encoded and at least one of a first metadata or a first audio data; and
multiplex a second encoded video data obtained when the third video signal is encoded and at least one of a second metadata or a second audio data.

2. The encoder according to claim 1, wherein the at least one processor is further configured to:
record, to a recording medium, the first encoded video data; and
record, to the recording medium, the second encoded video data.

3. The encoder according to claim 1, wherein the at least one processor is further configured to:
select one of the second video signal or the third video signal; and
encode one of the second video signal or the third video signal that is selected.

4. The encoder according to claim 1, wherein
the second video signal is the progressive signal at High Definition (HD) resolution with a frame rate of one of 29.97 Hz or 25 Hz.

5. The encoder according to claim 1, wherein
the first video signal is the progressive signal at a resolution of one of 4K or higher than 4K.

6. The encoder according to claim 1, wherein
the third video signal is encoded in ISO/IEC 13818-2 MPEG-2 mode.

7. The encoder according to claim 1, wherein
the third video signal is encoded in ISO/IEC 14496-10 MPEG-4 AVC mode.

8. The encoder according to claim 1, wherein
the at least one processor is further configured to encode a first audio signal to obtain a second audio signal and a third audio signal,
the third audio signal corresponds to the third video signal,
the second audio signal is different from the third audio signal,
the second audio signal corresponds to the first video signal in the progressive mode, and
the first audio signal is encoded subsequent to removal of noise of the first audio signal.

9. The encoder according to claim 1, wherein the first audio data and the second audio data are generated based on an audio signal.

10. The encoder according to claim 1, wherein the at least one processor is further configured to multiplex the first encoded video data and at least one of the first metadata or the first audio data in accordance with a file format.

11. The encoder according to claim 10, wherein the file format is one of a Material Exchange Format (MXF) or a MP4.

12. The encoder according to claim 1, wherein the at least one processor is further configured to multiplex the second encoded video data and at least one of the second metadata or the second audio data in accordance with a file format.

13. The encoder according to claim 12, wherein the file format is one of a Material Exchange Format (MXF) or a MP4.

14. The encoder according to claim 1, wherein the at least one processor is further configured to encode the third video signal in accordance with an encoding parameter.

15. The encoder according to claim 14, wherein the encoding parameter is set based on an encoding parameter of an external device.

16. An encoding method, comprising:
in an encoder:
encoding a first video signal in a progressive mode;
converting one of the first video signal or a second video signal to an interlaced signal from a progressive signal to obtain a third video signal, wherein the second video signal is obtained by reduction in at least one of a resolution or a frame rate of the first video signal;
encoding the third video signal;
multiplexing a first encoded video data obtained when the first video signal is encoded and at least one of a first metadata or a first audio data; and
multiplexing a second encoded video data obtained when the third video signal is encoded and at least one of a second metadata or a second audio data.

17. A camera, comprising:
at least one processor configured to:
obtain a first video signal in a progressive mode;
encode the first video signal;
convert one of the first video signal or a second video signal to an interlaced signal from a progressive signal to obtain a third video signal, wherein the second video signal is obtained by reduction in at least one of a resolution or a frame rate of the first video signal;
encode the third video signal;
multiplex a first encoded video data obtained when the first video signal is encoded and at least one of a first metadata or a first audio data; and
multiplex a second encoded video data obtained when the third video signal is encoded and at least one of a second metadata or a second audio data.

18. A recorder, comprising:
at least one processor configured to:
encode a first video signal in a progressive mode;
convert one of the first video signal or a second video signal to an interlaced signal from a progressive signal to obtain a third video signal, wherein the second video signal is obtained by reduction in at least one of a resolution or a frame rate of the first video signal;
encode the third video signal;
multiplex a first encoded video data obtained when the first video signal is encoded and at least one of a first metadata or a first audio data; and
multiplex a second encoded video data obtained when the third video signal is encoded and at least one of a second metadata or a second audio data;
record, to a recording medium, the first encoded video data; and
record, to the recording medium, the second encoded video data.

19. A camera-integrated recorder, comprising:
at least one processor configured to:
obtain a first video signal in a progressive mode;
encode the first video signal;
convert one of the first video signal or a second video signal to an interlaced signal from a progressive signal to obtain a third video signal, wherein the second video signal is obtained by reduction in at least one of a resolution or a frame rate of the first video signal;
encode the third video signal;
multiplex a first encoded video data obtained when the first video signal is encoded and at least one of a first metadata or a first audio data; and
multiplex a second encoded video data obtained when the third video signal is encoded and at least one of a second metadata or a second audio data;
record, to a recording medium, the first encoded video data; and
record, to the recording medium, the second encoded video data.

* * * * *